United States Patent
Lindmark et al.

(10) Patent No.: US 7,290,536 B2
(45) Date of Patent: Nov. 6, 2007

(54) CRANKCASE VENTILATION IN A COMBUSTION ENGINE FOR A VEHICLE

(75) Inventors: Jerker Lindmark, Bromma (SE); Andreas Dahl, Nyköping (SE); Anders Eklund, Stallarholmen (SE); Andreas Rindeskär, Detroit, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 73 days.

(21) Appl. No.: 11/362,636

(22) Filed: Feb. 27, 2006

(65) Prior Publication Data

US 2007/0199550 A1    Aug. 30, 2007

(51) Int. Cl.
*F02M 25/00* (2006.01)
(52) U.S. Cl. ..................... 123/572; 123/573
(58) Field of Classification Search ......... 123/572–574
See application file for complete search history.

(56) References Cited

U.S. PATENT DOCUMENTS

| | | | |
|---|---|---|---|
| 5,239,972 A * | 8/1993 | Takeyama et al. | 123/573 |
| 5,611,204 A * | 3/1997 | Radovanovic et al. | 60/605.2 |
| 6,606,982 B1 * | 8/2003 | Stockhausen et al. | 123/572 |
| 6,886,532 B2 * | 5/2005 | Nohara et al. | 123/401 |

* cited by examiner

*Primary Examiner*—Marguerite McMahon
(74) *Attorney, Agent, or Firm*—Ostrolenk, Faber, Gerb & Soffen, LLP

(57) ABSTRACT

The present invention relates to a combustion engine, comprising an intake system having a throttle valve controlling an air flow to the combustion engine, a brake booster being in fluid communication with the intake system, downstream the throttle valve, via an evacuation duct for evacuation of air from the brake booster to the intake system, a crankcase being in fluid communication with the intake system, downstream the throttle valve, via a low load duct for conducting crankcase gases to the intake system, a venturi tube forming part of the low load duct, wherein the venturi tube comprises a narrow venturi tube portion forming a flow resistance within the low load duct through which the crankcase gases have to pass, wherein the evacuation duct is also fluidly connected to the venturi tube portion, via a connection duct, for further evacuation of air from the brake booster to the intake system.

5 Claims, 1 Drawing Sheet

CRANKCASE VENTILATION IN A COMBUSTION ENGINE FOR A VEHICLE

BACKGROUND OF THE INVENTION

1. Field of the Invention

The present invention relates to a combustion engine for a vehicle, comprising a brake booster and a crankcase ventilation system.

2. Description of Prior Art

During operation of a combustion engine, there is a leakage of fully or partly combusted exhaust gases, between the piston rings and the cylinder wall, to the crankcase. Together with e.g. condensate from the engine oil present in the crankcase they form crankcase gases which need to be ventilated. To prevent unfiltered crankcase gases from being discharged directly to the environment, they are ventilated back to the intake system of the engine. This principle is generally referred to as PCV, Positive Crankcase Ventilation.

FIG. 1 shows a combustion engine according to related art, which suggests that during low engine load operation, i.e. when the compressor 7 is not in operation and an underpressure prevails downstream the throttle valve 5, the crankcase gases are conducted from the crankcase 9, to the intake system 3 downstream the throttle valve 5, via a low load duct 11. The underpressure that prevails downstream the throttle valve 5 during low engine load operation secures the PCV-ventilation. During high engine load operation, i.e. when the compressor 7 is in operation and an overpressure prevails downstream the throttle valve 5, the crankcase gases can no longer be conducted through the low load duct 11, due to the raised pressure inside the intake system 3 downstream the throttle valve 5. Instead the crankcase gases are conducted from the crankcase 9, to the intake system 3 upstream the air compressor 7, via a high load duct 13. The underpressure that prevails upstream the compressor 7 during high engine load operation secures the PCV-ventilation in these situations.

However during low engine load operation, the crankcase gas flow through the low load duct 11 implies an addition of gas volumes to the intake system 3 downstream the throttle valve 5, which makes the control of the idling speed of the engine 1 more difficult. The reason is that the throttle valve 5 has to compensate for these extra gas volumes by closing the throttle valve 5 even further, but during idling speed operation of the combustion engine 1 this can be difficult to achieve, since the throttle valve 5 is already almost closed. Thus, speed variations will occur.

The braking system of a vehicle normally comprises a brake booster 27, which serves to enhance the force from the foot of the driver when he operates the brake pedal. Thus, an underpressure is created within the brake booster 27, which assists the driver when operating the brake pedal. The underpressure is commonly created by fluidly connecting the brake booster 27 with the intake system 3 downstream the throttle valve 5 by means of an evacuation duct 29. When the driver activates the brake pedal, the ambient atmosphere leaks into the brake booster 27 and is thereafter evacuated to the intake system 3 via the evacuation duct 29. Hereby, the pressure within the brake booster 27 will assume the same pressure as in the intake system 3.

To further reduce the pressure within the brake booster, a venturi tube 15 can be employed. This venturi tube 15 forms part of a by-pass duct 12 and comprises a narrow venturi tube portion 19 forming a flow resistance within the by-pass duct 12. A first end 14 of the by-pass duct 12 is fluidly connected to the intake system 3 upstream the throttle valve 5, while a second end 16 is fluidly connected to the intake system 3 downstream the throttle valve 5. During low engine load operation there is a pressure drop over the throttle valve 5, resulting in an air flow from the first end 14 to the second end 16 of the by-pass duct 12. When air passes the narrow venturi tube portion 19, the kinetic energy of the air increases while its pressure decreases. Since the pressure that prevails just downstream the venturi tube 15 is the same as the pressure within the intake system 3 downstream the throttle valve 5, the pressure within the narrow venturi tube portion 19 will decrease below the pressure within the intake system 3 downstream the throttle valve 5. Moreover, the evacuation duct 29 is fluidly connected to this narrow venturi tube portion 19, and therefore the pressure within the evacuation duct 29 and the pressure within the brake booster 27 will assume the same pressure as the pressure within the narrow venturi tube portion 19, i.e. below the pressure inside the intake system 3 downstream the throttle valve 5.

However, since the air flow through the evacuation duct 29 also implies an addition of gas volumes to the intake system downstream the throttle valve 5, the control of the idling speed of the engine 1 will be even more difficult.

OBJECT OF THE INVENTION

The object of the present invention is to provide a combustion engine having a more easily controlled idling speed operation.

SUMMARY OF THE INVENTION

To this end, according to the invention, there is provided a combustion engine, comprising an intake system having a throttle valve controlling an air flow to the combustion engine, a brake booster being in fluid communication with the intake system, downstream the throttle valve, via an evacuation duct for evacuation of air from the brake booster to the intake system, a crankcase being in fluid communication with the intake system, downstream the throttle valve, via a low load duct for conducting crankcase gases to the intake system, a venturi tube forming part of the low load duct, wherein the venturi tube comprises a venturi tube portion forming a flow resistance within the low load duct through which the crankcase gases have to pass, wherein the evacuation duct is also fluidly connected to the venturi tube portion, via a connection duct, for further evacuation of air from the brake booster to the intake system.

Since the low load duct is provided with a venturi tube through which the crankcase gases have to flow, and since the evacuation duct is fluidly connected to the venturi portion several advantages are achieved. Firstly, a separate duct with a venturi tube and which is by-passing the throttle valve (as depicted in FIG. 1) is no longer necessary. So instead of having two ducts which are adding air/crankcase gases to the intake system downstream the throttle valve, only one duct is required for solving the same problem. The consequence is a more easily controlled idling speed operation. In the related art example depicted in FIG. 1, the low load duct was provided with a flow control element which served to control the amount of crankcase gases that was ventilated from the crankcase, so as to avoid a too low pressure or too high pressure inside the crankcase. In the combustion engine according to the invention, the venturi tube portion has the same function as the flow control element in FIG. 1. Thus, with a suitable dimensioning of the cross-sectional area of the venturi tube portion a controlled ventilation of crankcase gases is achieved. In the related art example the by-passed air flow through duct 12 served as an "assisting flow" with the purpose to further decrease the pressure inside the brake booster. According to the invention, the crankcase gases adopt this "assisting flow" function.

Preferably, the venturi tube portion comprises a port to which a first end of the connection duct is fluidly connected, wherein a second end of the connection duct is fluidly connected to the evacuation duct. Suitably, a non return valve is arranged inside the evacuation duct, so as to prevent air from flowing from the intake system to the brake booster, and preferably a non return valve is also arranged inside the low load duct, so as to prevent air from flowing from the intake system to the crankcase. Hereby a reversed flow to the crankcase and/or the brake booster is avoided.

Preferably, the venturi tube portion has a cross-sectional area, the size of which is determined by the desired crankcase gas flow in the low load duct. Hereby a controlled ventilation of crankcase gases is achieved so that a too low or too high pressure inside the crankcase is avoided.

DETAILED DESCRIPTION

Figure 2:
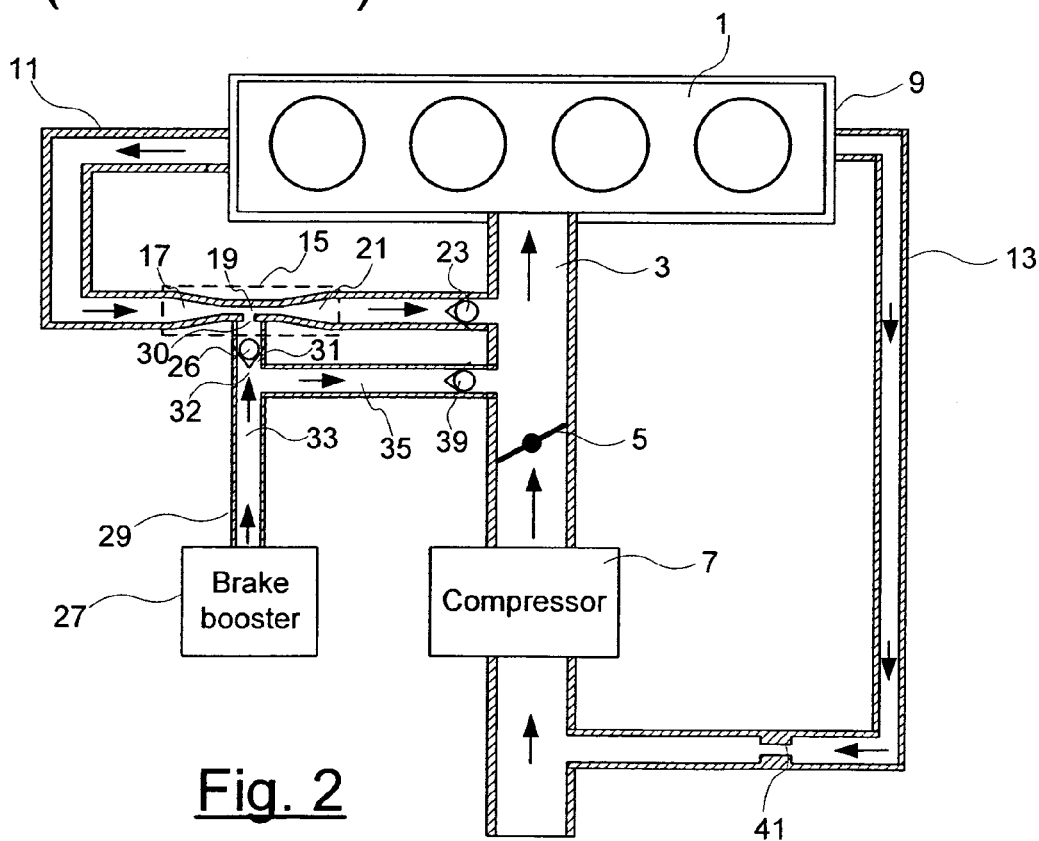
FIG. 2 shows a combustion engine according to the invention.

FIG. 2 schematically depicts a 4-cylinder combustion engine 1. An air intake system 3 is fluidly connected to the cylinders of the combustion engine 1. A throttle valve 5 is provided inside the intake system 3 and serves to adjust the amount of air that is fed to the cylinders in dependence of the actual driving situation. A compressor 7 is connected to the intake system 3, upstream the throttle valve 5, to supercharge the air being fed to the cylinders if the driving situation so requires. The compressor 7 can be driven by means of a crankshaft, an exhaust gas turbine or by any other suitable mechanical/electrical means.

The combustion engine 1 comprises a crankcase 9 being provided in the bottom of the combustion engine. During engine operation blow-by gases are leaked to the crankcase 9 as described earlier. A low load duct 11 fluidly connects the crankcase 9 with the intake system 3 downstream the throttle valve 5. A high load duct 13 also fluidly connects the crankcase 9 with the intake system 3 upstream the compressor 7. A venturi tube 15 forms part of the low load duct 11. The venturi tube 15 comprises a converging venturi tube portion 17, a narrow venturi tube portion 19 and a diverging venturi tube portion 21. Thus, the narrow venturi tube portion 19 forms a flow resistance inside the low load duct 11. Inside the low load duct 11, downstream the venturi tube 15, a first non-return valve 23 is arranged. The first non-return valve 23 only admits a gas to flow from the crankcase 9 to the intake system 3, but not in the opposite direction, i.e. towards the crankcase 9.

The combustion engine 1 also comprises a brake booster 27 which serves to facilitate braking when a driver operates a not shown brake pedal. An evacuation duct 29 fluidly connects the brake booster 27 with the intake system 3 downstream the throttle valve 5. The evacuation duct 29 is fluidly connected to a port 30 of the narrow venturi tube portion 19 by means of a first end of a connection duct 31. A second end of the connection duct 31 is fluidly connected to the evacuation duct 29 at a connection point 32, thus dividing the evacuation duct 29 in a first evacuation duct portion 33 and a second evacuation duct portion 35. The first evacuation duct portion 33 is fluidly connected to the brake booster 27, while the second evacuation duct portion 35 is fluidly connected to the intake system 3 downstream the throttle valve 5. The flow resistance of the narrow venturi tube portion is greater than the flow resistance within the evacuation duct 29.

A second non-return valve 39 is provided inside the second evacuation duct portion 35 to admit gas to flow from the brake booster 27 to the intake system 3, but to prevent gas from flowing from the intake system 3 into the evacuation duct. A third non-return valve 26 is provided inside the connection duct 31 to admit air to flow from the brake booster to the low load duct 11 via the port 30, but to prevent crankcase gases from flowing from the low load duct 11 to the evacuation duct 29 via the port 30.

OPERATION

The operation of the combustion will now be described. The term "underpressure" generally refers to a pressure below the ambient pressure, while the term "overpressure" refers to a pressure above the ambient pressure.

During engine operation, when an underpressure prevails inside the intake system 3 downstream the throttle valve 5, the same underpressure will also prevail in the first 33 and second 35 evacuation duct portions. When the driver operates the brake pedal during a braking situation, the ambient atmosphere will flow into the brake booster 27, and when the driver releases the brake pedal, it will be evacuated through the first 33 and second 35 evacuation duct portions to the intake system 3 (as indicated by the arrows). Thus, the pressure within the brake booster 27 will, after completed evacuation, assume the same pressure as the pressure inside the intake system 3 downstream the throttle valve 5.

An underpressure will also prevail inside the low load duct 11 downstream the venturi tube 15. This underpressure will draw crankcase gases from the crankcase 9 through the low load duct 11 via the venturi tube 15 and further on to the intake system 3. When the crankcase gases pass the narrow venturi tube portion 19 their kinetic energy will increase due their increased speed. Thus, the pressure inside the narrow venturi tube portion 19 will drop to a level below the pressure inside the intake system 3. Since the evacuation duct 29 is fluidly connected to the narrow venturi tube portion 19 via the connection duct 31, this lower pressure will evacuate further amounts of air from the brake booster 27 to the intake system 3, via the connection duct 31 and the venturi tube 15. Thus, the pressure inside the brake booster 27 will assume a pressure level that is lower than the pressure inside the intake system 3. Thus, braking performance is improved.

The narrow venturi tube portion 19 also forms a flow resistance within the low load duct 11, where the size of the narrow venturi tube portion 19 secures that a controlled amount of crankcase gases are ventilated to the intake system 3. Therefore a too low or a too high pressure level will not arise inside the crankcase 9, which pressure levels could jeopardize the function of the combustion engine 1.

During high engine load operation, i.e. the air is supercharged, an overpressure will prevail in the intake system 3 downstream the throttle valve 5. Therefore, the low load duct 11 can no longer be used for ventilating crankcase gases from the crankcase 9 to the intake system 3. Instead, the high load duct 13 is employed since an underpressure will prevail in the intake system 3 upstream the compressor 7 during high engine load operation. A flow control element 41 is arranged inside the high load duct 13 to control the amount of crankcase gases that are ventilated to the intake system 3 so as to avoid a too low or a too high pressure within the crankcase 9.

The first non-return valve 23 will secure that no air is conducted to the crankcase 9 when an overpressure prevails inside the intake system 3 downstream the throttle valve 5, and the second non-return 39 valve will prevent air from being conducted from the intake system 3 to the brake booster 27.

When an overpressure prevails inside the intake system 3 downstream the throttle valve 5 no air can be evacuated from the brake booster 27 to the intake system 3 due to the higher pressure level inside the intake system 3 downstream the throttle valve 5, compared to the pressure inside the brake booster 27. However, in case of braking the situation will quickly turn into a situation where an underpressure will prevail in the intake system 3 downstream the throttle valve 5, since the throttle valve closes during braking when the driver releases the accelerator pedal.

Figure 1:
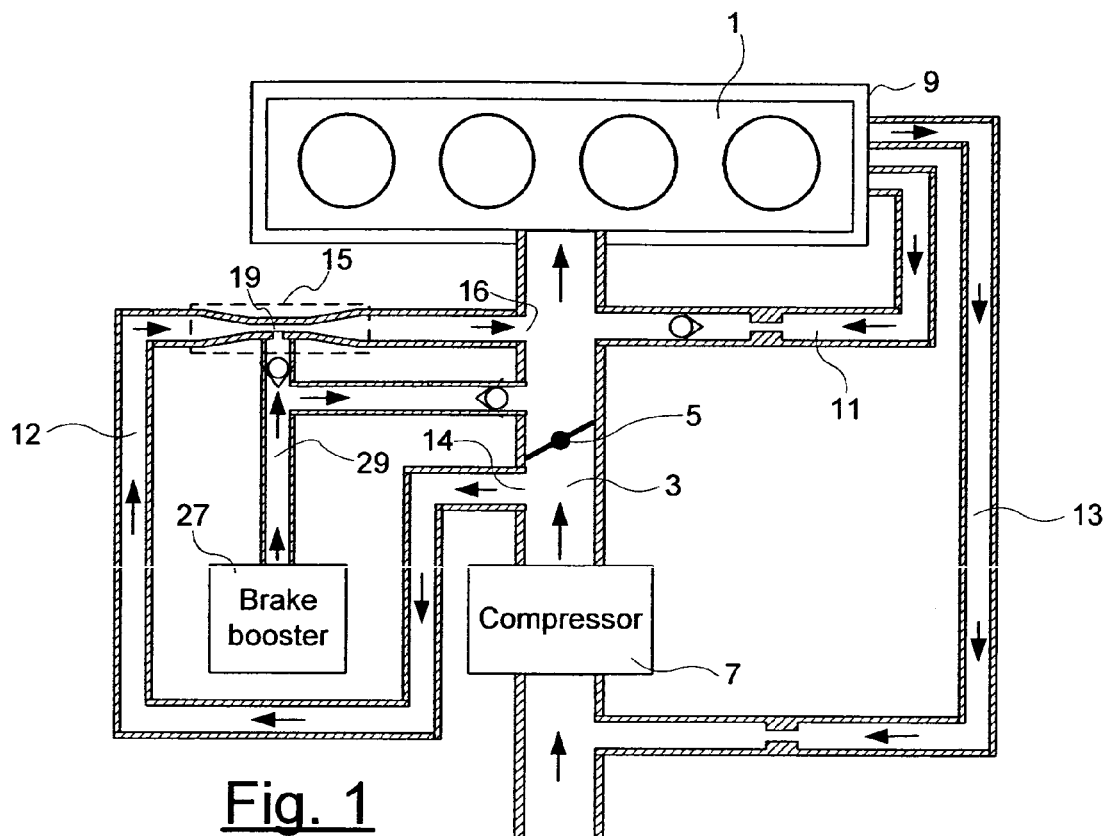
FIG. 1 shows a combustion engine according to related art.

Compared to the combustion engine according to related art and which is depicted in FIG. 1 several advantages are achieved. Firstly, a separate duct with a venturi tube and which is by-passing the throttle valve (as depicted in FIG. 1) is no longer necessary. So instead of having two ducts which are adding air/crankcase gases to the intake system downstream the throttle valve, only one duct is required for solving the same problem. The consequence is a more easily controlled idling speed operation of the combustion engine. In the related art example depicted in FIG. 1, the low load duct 11 was provided with a flow control element which served to control the amount of crankcase gases that were ventilated from the crankcase 9, so as to avoid a too low or too high pressure. In the combustion engine according to the invention, the venturi tube portion 19 has the same function as the flow control element in FIG. 1. Thus, with a suitable dimensioning of the cross-sectional area of the venturi tube portion 19 a controlled ventilation of crankcase gases is achieved.

The invention claimed is:

1. Combustion engine, comprising:

an intake system having a throttle valve controlling an air flow to the combustion engine, a brake booster being in fluid communication with the intake system, downstream the throttle valve, via an evacuation duct, for evacuation of air from the brake booster to the intake system, a crankcase being in fluid communication with the intake system, downstream the throttle valve, via a low load duct for conducting crankcase gases to the intake system, a venturi tube forming part of the low load duct, wherein the venturi tube comprises a venturi tube portion forming a flow resistance within the low load duct through which the crankcase gases have to pass, wherein the evacuation duct is also fluidly connected to the venturi tube portion, via a connection duct, for further evacuation of air from the brake booster to the intake system.

2. Combustion engine according to claim 1, wherein the venturi tube portion comprises a port to which a first end of the connection duct is fluidly connected, wherein a second end of the connection duct is fluidly connected to the evacuation duct.

3. Combustion engine according to claim 1, wherein a non return valve is arranged inside the low load duct, so as to prevent air from flowing from the intake system to the crankcase.

4. Combustion engine according to claim 1, wherein a non return valve is arranged inside the evacuation duct, so as to prevent air from flowing from the intake system to the brake booster.

5. Combustion engine according to claim 1, wherein the venturi tube portion has a cross-sectional area, the size of which is determined by the desired crankcase gas flow in the low load duct.

\* \* \* \* \*